United States Patent
Thompson

(10) Patent No.: US 10,740,972 B2
(45) Date of Patent: Aug. 11, 2020

(54) SYSTEM AND METHOD FOR PRESENTATION AND CONTROL OF AUGMENTED VEHICLE SURROUND VIEWS

(71) Applicant: Harman International Industries, Incorporated, Stamford, CT (US)

(72) Inventor: Aaron Thompson, Brighton, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 15/582,488

(22) Filed: Apr. 28, 2017

(65) Prior Publication Data

US 2018/0315244 A1    Nov. 1, 2018

(51) Int. Cl.
```
G09B 9/08      (2006.01)
G06T 19/00     (2011.01)
H04N 5/445     (2011.01)
H04N 5/232     (2006.01)
H04N 7/18      (2006.01)
G06T 19/20     (2011.01)
G06T 15/20     (2011.01)
B60R 1/00      (2006.01)
```
(Continued)

(52) U.S. Cl.
CPC ............ *G06T 19/006* (2013.01); *A63F 13/53* (2014.09); *A63F 13/803* (2014.09); *B60R 1/002* (2013.01); *G06T 11/00* (2013.01); *G06T 15/205* (2013.01); *G06T 19/20* (2013.01); *H04N 5/23238* (2013.01); *H04N 5/23293* (2013.01); *H04N 5/44504* (2013.01); *H04N 7/181* (2013.01); *A63F 2300/8082* (2013.01); *B60R 2300/102* (2013.01); *B60R 2300/303* (2013.01); *B60R 2300/802* (2013.01); *G06T 2215/16* (2013.01); *G06T 2219/2004* (2013.01)

(58) Field of Classification Search
CPC ....................... G06T 19/006; A63F 2300/8082
See application file for complete search history.

(56) References Cited

U.S. PATENT DOCUMENTS 8,922,592 B2 * 12/2014 Hirose ............... G01C 21/3638
                                                        345/650
2007/0252833 A1 * 11/2007 Kuroki .................... G06T 15/20
                                                        345/427

(Continued)

*Primary Examiner* — Samantha (Yuehan) Wang
(74) *Attorney, Agent, or Firm* — McCoy Russell LLP

(57) ABSTRACT

The present disclosure relates to systems, devices and methods for presentation and control of a virtual vehicle view with surround view imaging. Surround view imaging may be augmented with iconography. In one embodiment, a method includes generating a stitched image view based on surround view image data for a vehicle includes the stitched image view and virtual camera position data to an augmented reality module of the first device, determining a pose estimation for the vehicle to provide vehicle position and orientation, and augmenting the stitched image view to include graphical elements based on the pose estimation and virtual camera position. Presentation of the stitched image view including the one or more graphical elements can be updated based on changes to a virtual camera position direction and angle, changes in vehicle position and control inputs. Device and systems are provided to present augmented surround view imaging.

20 Claims, 10 Drawing Sheets

(51) Int. Cl.
*A63F 13/53* (2014.01)
*A63F 13/803* (2014.01)
*G06T 11/00* (2006.01)

(56) References Cited

U.S. PATENT DOCUMENTS

| | | | |
|---|---|---|---|
| 2010/0259372 A1* | 10/2010 | Hideshiro | G06T 3/4038 340/435 |
| 2014/0063197 A1 | 3/2014 | Yamamoto et al. | |
| 2014/0333729 A1* | 11/2014 | Pflug | G06T 15/20 348/47 |
| 2015/0054913 A1* | 2/2015 | Annau | G06F 3/04847 348/36 |
| 2017/0061813 A1* | 3/2017 | Tao | G09B 9/08 |
| 2018/0192033 A1* | 7/2018 | Gallup | H04N 5/247 |

* cited by examiner

SYSTEM AND METHOD FOR PRESENTATION AND CONTROL OF AUGMENTED VEHICLE SURROUND VIEWS

FIELD

The present disclosure relates to systems, methods and devices for presentation of surround view imaging, and more particularly to presentation and control of augmented vehicle virtual views with surround view imaging.

BACKGROUND

In recent years, vehicles have been outfitted with cameras to provide an external view. Many vehicles include single camera back-up cameras for parking assistance. In addition, the inclusion of cameras for vehicles has increased. Often these cameras are used for driver assistance and to improve vehicle safety. While cameras are known to provide views for parking assistance, use of these devices is often limited. In addition, many vehicles disable operation of cameras to prevent driver distraction while a vehicle is in motion. There exists a need to utilize vehicle cameras to provide additional functions. There also exists a need to augment image data for presentation in the vehicle.

BRIEF SUMMARY OF THE EMBODIMENTS

Disclosed and claimed herein are methods, devices and systems for presentation and control of an augmented virtual vehicle view with surround view imaging. One embodiment is directed to a method including generating, by a first device, a stitched image view based on surround view image data for a vehicle, wherein the surround view image data is generated based on multiple image sensors of the vehicle. The method also includes outputting, by the first device, the stitched image view and virtual camera position data to an augmented reality module of the first device. The method also includes determining, by the first device, a pose estimation for the vehicle, wherein the pose estimation provides vehicle position and orientation relative to the stitched image view. The method also includes augmenting, by the first device, the stitched image view to include one or more graphical elements based on the pose estimation for the vehicle and virtual camera position. The method also includes presenting, by the first device, a graphical display of the stitched image view including the one or more graphical elements.

In one embodiment, the surround view image data includes image data for a complete 360 degree circumferential image with respect to position of the vehicle and the stitched image relates to a portion of the circumferential image from the perspective of the virtual camera position.

In one embodiment, a surround view module of the first device outputs the stitched image view and virtual camera position data to an augmented reality module of the first device, the virtual camera position data including six degree of freedom camera data.

In one embodiment, an augmented reality module of the first device determines a pose estimation for the vehicle based on data generated by a vehicle sensor for acceleration and tilt of the vehicle.

In one embodiment, augmenting the stitched image view by the first device includes presentation of a vehicle avatar and iconography for points of interest based on the pose estimation for the vehicle and virtual camera position.

In one embodiment, presenting the graphical display of the stitched image view including the one or more graphical elements includes arranging iconography for one or more points of interest in a display window based on the pose estimation, wherein the pose estimation and virtual camera position allow for placement of the iconography into stitched image based on the direction of the vehicle.

In one embodiment, virtual camera position data provides six degrees of freedom data characterizing the stitched image view output by a surround view module.

In one embodiment, augmenting the stitched image includes visualization of the points of interest in the surround view image data provides presentation of graphical elements to match physical locations of elements outside of the vehicle.

In one embodiment, the method further includes detecting changes to a virtual camera position and updating the output image to modify position of graphical elements in a displayed view.

In one embodiment, the method further includes detecting position commands for the avatar position within the output display and updating position of the avatar and iconography.

Another embodiment is directed to a vehicle control unit for presentation and control of an augmented virtual vehicle view with surround view imaging. In one embodiment, the vehicle control unit includes a surround view module configured to generate a stitched image view based on surround view image data for a vehicle, wherein the surround view image data is generated based on multiple image sensors of the vehicle, and output the stitched image view and virtual camera position data to an augmented reality module of the first device. The device also includes an augmented reality module configured to determine a pose estimation for the vehicle, wherein the pose estimation provides vehicle position and orientation relative to the stitched image view, and augment the stitched image view to include one or more graphical elements based on the pose estimation for the vehicle and virtual camera position. The device also includes a control input module configured to control presentation of a graphical display of the stitched image view including the one or more graphical elements.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 2:
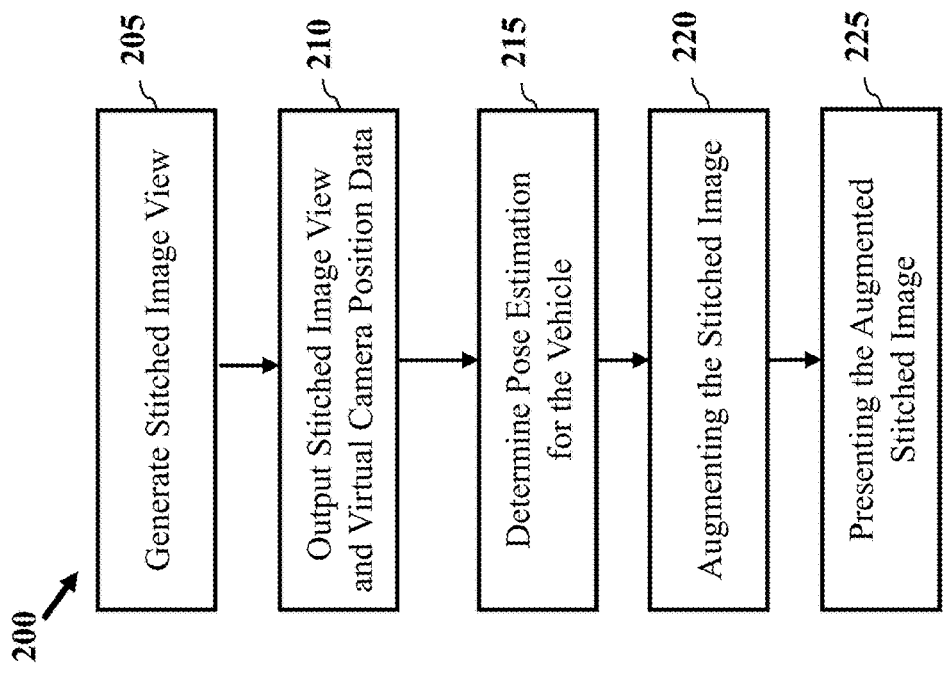
FIG. 2 depicts a process for presenting an augmented virtual vehicle view according to one or more embodiments.

One aspect of the disclosure is directed to providing surround view image data for a vehicle and augmenting the surround view. Surround view imaging relates to generating image data to provide a complete, 360 degree, image of vehicle surroundings. Embodiments discussed herein include the use of multiple cameras to capture multiple views from the vehicle and a surround view module to generate a surround view. The surround view module may output a portion of the surround view. Most displays are two dimensional and the stitched image allows for display of a portion of the surround view, even if image data of the stitched image is from multiple image detection sources. According to the principles discussed herein, control inputs may be detected and utilized to modify the portion of the surround view presented. Image data output for display may be stitched image data generated as a composite of image data detected by the multiple camera inputs.

Embodiments are directed to presentation and control of an augmented virtual vehicle view with surround view imaging. System and device configurations are provided to generate a surround view image, receive control inputs, augment surround view image data and output augmented image data relative to a vehicle including graphical elements such as iconography. In one embodiment, the augmented surround view image data is provided for passenger entertainment and use to allow for display of points of interest. According to another embodiment, augmentation allows for gaming elements to be integrated with surround view image data.

According to another embodiment, stitched image data may be presented from the perspective of a virtual camera position. In certain embodiments, the stitched image is coincidental with the virtual camera position. A virtual camera position may relate to a particular view point for representation, such as from the perspective of above a vehicle and/or behind the vehicle looking out in the direction of travel or other directions for that matter. A virtual camera position does not relate to an actual position of an image sensing device, but rather a representation from a vantage point for projecting image data. According to one embodiment, the surround view image relates to an inner toroid surface wherein the stitched image represents the inner wall of the toroid, the inner wall generated by stitching image data from the multiple camera inputs together. The stitched image may relate to an augmented reality as image data presented relates to composite image data generated from one or more image sources.

Embodiments discussed herein are directed to augmentation of stitched image data by presentation of graphical elements in a three dimensional space using virtual camera position data. In addition to utilizing a virtual camera position, virtual camera position data may be generated and utilized to determine wherein in three dimensional space graphical elements should appear. The virtual camera position data may describe the perspective that stitched image data is taken from using six degrees of freedom data. The virtual camera position data my include outputting a coordinate space generated with the stitched image. In addition to virtual camera data, pose estimation of the vehicle may be performed to identify vehicle arrangement. The pose estimation may provide vehicle position and orientation relative to the stitched image view. In one embodiment, augmentation of stitched images include overlaying one or more graphical elements based on the pose estimation for the vehicle and virtual camera position.

In one embodiment, system and device configurations are provided including a control module, surround view module and augmented reality module to allow for augmentation of surround view image data for a vehicle while allowing for manipulation of a virtual camera view.

According to another aspect, surround view images for a vehicle may be augmented with gaming elements. System configurations, devices and methods are discussed herein for augmentation surround view images with gaming system iconography and control of display elements based on control inputs.

Another aspect of the disclosure is directed to providing a passenger display system with control to allow for rotation and control of a display view and thus, presentation of iconography in a three dimensional space independent of surround view image detection. The passenger display system may include generating and orienting virtual iconography in video merged together from multiple sources. The display system may include determining the viewport from external input and providing the window to an augmented reality overlay engine to augment surround view image data. The device may include a blockchain apparatus for "in-app" purchases, a point of interest (POI) interface for generic POI injection, use with tour guides, gaming icons, etc.

Another aspect of the disclosure is directed to augmented reality using multiple camera inputs. Virtual iconography may be generated and oriented in video merged together from multiple sources. Waypoints and POIs may be customized and interacted with during vehicle operation.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1:
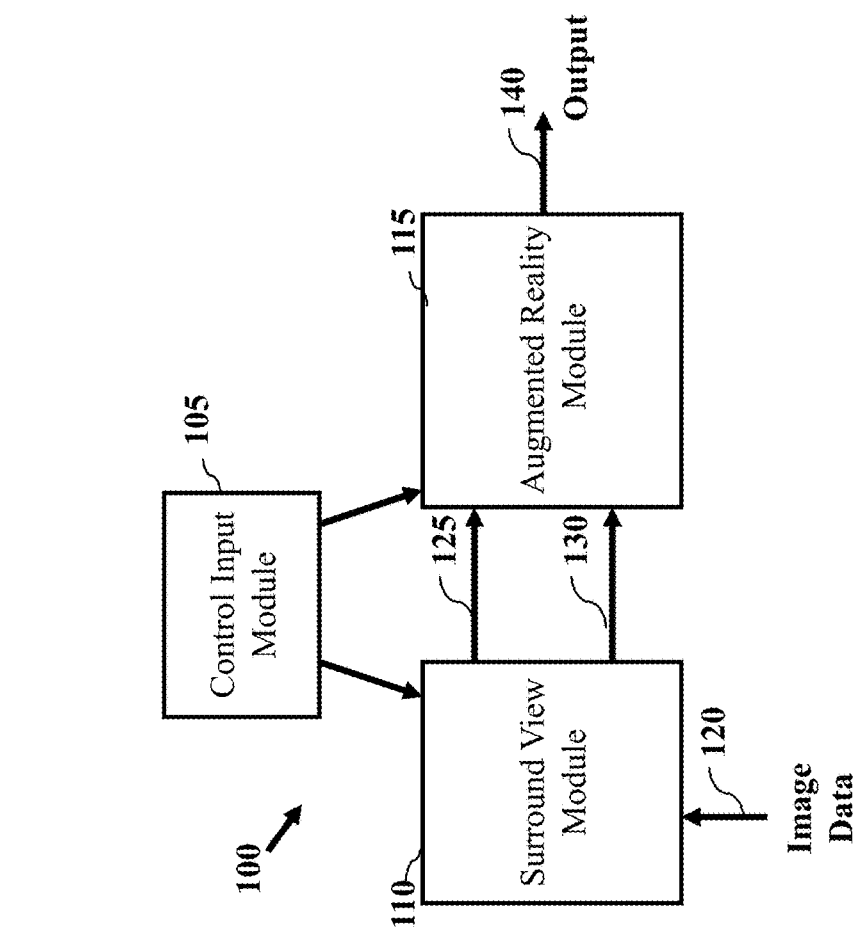
FIG. 1 depicts a graphical representation of components for presentation and control of an augmented virtual vehicle view with surround view imaging according to one or more embodiments.

Referring now to the figures, FIG. 1 depicts a graphical representation of components for presentation and control of an augmented virtual vehicle view with surround view imaging according to one or more embodiments. System 100 may be configured to output a stitched image relative to a virtual camera position, input controls and one or more graphical elements to identify points of interest and iconography. According to one embodiment, system 100 relates to a vehicle control unit. System 100 includes a control input module 105, surround view module 110 and augmented reality module 115. System 100 may additionally include elements and modules as discussed herein. According to one embodiment, a control input module 105, surround view module 110 and augmented reality module 115 may each relate to one or more of a physical module, such as controller (e.g., processor, processing unit, etc.), and software module, such as an application or program within a vehicle unit. As will be described below, control input module 105, surround view module 110 and augmented reality module 115 may be associated with one or more devices. By providing virtual camera position data, augmented reality module 115 is provided with a direction and coordinate mapping for the stitched image in space relative to the location of the vehicle. By then estimating vehicle attributes, such as a pose estimation, object locations may be positioned in space relative to the virtual camera position data.

According to one embodiment, control input module 105 controls both surround view module 110 and augmented reality view 115. According to another embodiment, control input module 110 may be configured to control presentation of augmented imagery relative to a vehicle. In one embodiment, control input module 105 outputs a command to surround view module 110 and augmented reality module 115 to present a stitched image. The initial presentation of the stitched image may relate to a forward direction of a vehicle. Based on one or more use commands detected by control input module 105, commands may be output to surround view module 110 and augmented reality module 115 to modify the viewing angle, update the presentation of display elements and control presentation output. Control input module 105 may include full control of virtual camera position.

According to one embodiment, surround view module 110 is configured to receive image data 120 and output a stitched image, shown as 125, and virtual camera position data, shown as 130, to augmented reality module 115.

According to one embodiment, input image data 120 relates to image data captured by a vehicle, such as multiple camera inputs relating to a front, left side, right side and rear view of the vehicle. Surround view module 110 is configured to generate a surround view image and output a stitched image 125. In one embodiment, surround view module 110 generates a surround view image by combining image data detected by multiple cameras. Surround view module 110 may then combine the image data and output stitched image 125 representing a portion of the surround view. In certain embodiments, stitched image 125 relates to a portion of the surround view associated with a virtual camera position. In other embodiments, stitched image 125 relates to a portion of the surround view image data selected to present on a display of the vehicle based on input detected by control input module 105. Virtual camera position data 130 provides six degrees of freedom data associated with stitched image 125. By way of example, virtual camera position data 130 provides each of a forward/back data set, up/down data set, left/right data set, pitch data set, yaw data set, and roll data set associated describing the direction of a virtual camera position.

According to one embodiment, augmented reality module 115 is configured to receive a stitched image 125, virtual camera position data 130 and control input commands to output an augmented image output 140. According to another embodiment, augmentation of image data such as surround view image data may include output of additional elements such as sound based on one or more of a detected pose, presented view, user input, vehicle location, vehicle operation, etc.

FIG. 2 depicts a process for presenting an augmented virtual vehicle view according to one or more embodiments. Process 200 may be employed by a device, such as a vehicle control unit of a system (e.g., system 100) and one or more other components to output a surround view presentation. Process 200 may be performed by a single device or multiple devices. As will be described herein, a surround view module and augmented reality module of the first device may be software modules executed by a processor. In other embodiments, the surround view module and augmented reality module may be performed by two devices, such as a vehicle unit and module bile interoperating with the vehicle unit.

According to one embodiment, process 200 may be initiated by a first device or module (e.g., surround view module 110) generating a stitched image view based on surround view image data for a vehicle at block 205. In one embodiment, the surround view data is generated based on multiple image sensors of the vehicle. For example, the surround view image data can include image data for a complete 360 degree circumferential image with respect to position of the vehicle and the stitched image relates to a portion of the circumferential image from the perspective of the virtual camera position. The stitched image may be generated based on a virtual camera position. For example, a control input module or user input can indicate a desired viewing window. In response, the stitched image may be generated form surround view image data to match the viewing angle and direction of the virtual camera position data. The vehicle system and surround view module, in particular, may generate virtual camera position data to indicate the viewing angle and direction of the virtual camera position. In one embodiment, virtual camera position data provides six degrees of freedom data characterizing the stitched image view output by a surround view module. By providing virtual camera position data to an augmented reality module, the position of graphical elements can be matched to a 3-dimensional space. In one embodiment, a visualization positions iconography to be within a 3 dimensional coordinate system as an overlay to image data. In that fashion, the system does not have to parse the actual image data itself to determine location for presentation of items, location of items can be updated as the virtual camera position viewing direction changes, and items can be placed using the virtual camera position data. In some instances, based on changes in viewing direction, items can be removed from view when a viewing direction or field of view is no longer associated with position of a point of interest.

At block 210, the stitched image view and virtual camera position data are output to an augmented reality module of the first device. In one embodiment, a surround view module of the first device outputs the stitched image view and virtual camera position data to an augmented reality module of the first device, the virtual camera position data including six degree of freedom camera data.

At block 215, a pose estimation is determined for the vehicle. In one embodiment, an augmented reality module of the first device determines a pose estimation for the vehicle based on data generated by a vehicle sensor for acceleration and tilt of the vehicle.

At block 220, the stitched image view is augmented to include one or more graphical elements based on the pose estimation for the vehicle and virtual camera position. In one embodiment, augmenting the stitched image view by the first device includes presentation of a vehicle avatar and iconography for points of interest based on the pose estimation for the vehicle and virtual camera position. According to another embodiment, augmenting the stitched image includes visualization of the points of interest in the surround view image data provides presentation of graphical elements to match physical locations of elements outside of the vehicle.

At block 225, a graphical display of the stitched image view is presented to include the one or more graphical elements. In one embodiment, presenting the graphical display of the stitched image view including the one or more graphical elements includes arranging iconography for one or more points of interest in a display window based on the pose estimation, wherein the pose estimation and virtual camera position allow for placement of the iconography into stitched image based on the direction of the vehicle. Iconography such as graphical elements for a point of interest, gaming characters, gaming targets, gaming obstacles, icons and alerts may be positioned and presented by a display with stitched image data. In one embodiment, object presentation is determined based on vehicle position. By way of example, as a vehicle nears a point of interest, the graphical element representing the point of interest may be enlarged and/or the display position may be modified. In gaming applications, iconography and gaming elements may be manipulated. For example, a vehicle avatar may be manipulated based on input controls to change the direction and even manipulate display position to direct the avatar towards one or more gaming targets (or avoid gaming elements displayed), in which case the target positioning may be based on virtual camera position data and control commands for displayed and controllable elements.

At block 225, output of image data and augmented display elements may include output of one or more audio elements. For example, when a view is modified to present a point of interest one or more sound effects may be output to notify a user of a graphical element in a display presentation. For gaming applications, sound output based on the virtual view may be started, modified or stopped in association with user input commands and display elements depicted. Audio elements output by the system may include alerts, music, recorded voice, driver assistance, etc.

In one embodiment, process 200 includes detecting changes to a virtual camera position and updating the output image to modify position of graphical elements in a displayed view. An input device such as a controller or touch screen interface of a display interface may detect commands to change or rotate viewing angle for the virtual camera. The presentation may be updated to reflect detected input commands and a stitched image or portion of the surround view may be presented associated with the control input.

In one embodiment, process 200 includes detecting position commands for the avatar position within the output display and updating position of the avatar and iconography. In certain embodiments, control inputs may be detected resulting in modifying the presentation format of an iconography. For example directional changes with respect to a vehicle avatar may modify the display to show the vehicle avatar as turning rotating associated with the direction change. Once the directional command is released the presentation of the vehicle avatar may return to an initial display format.

Figure 3:
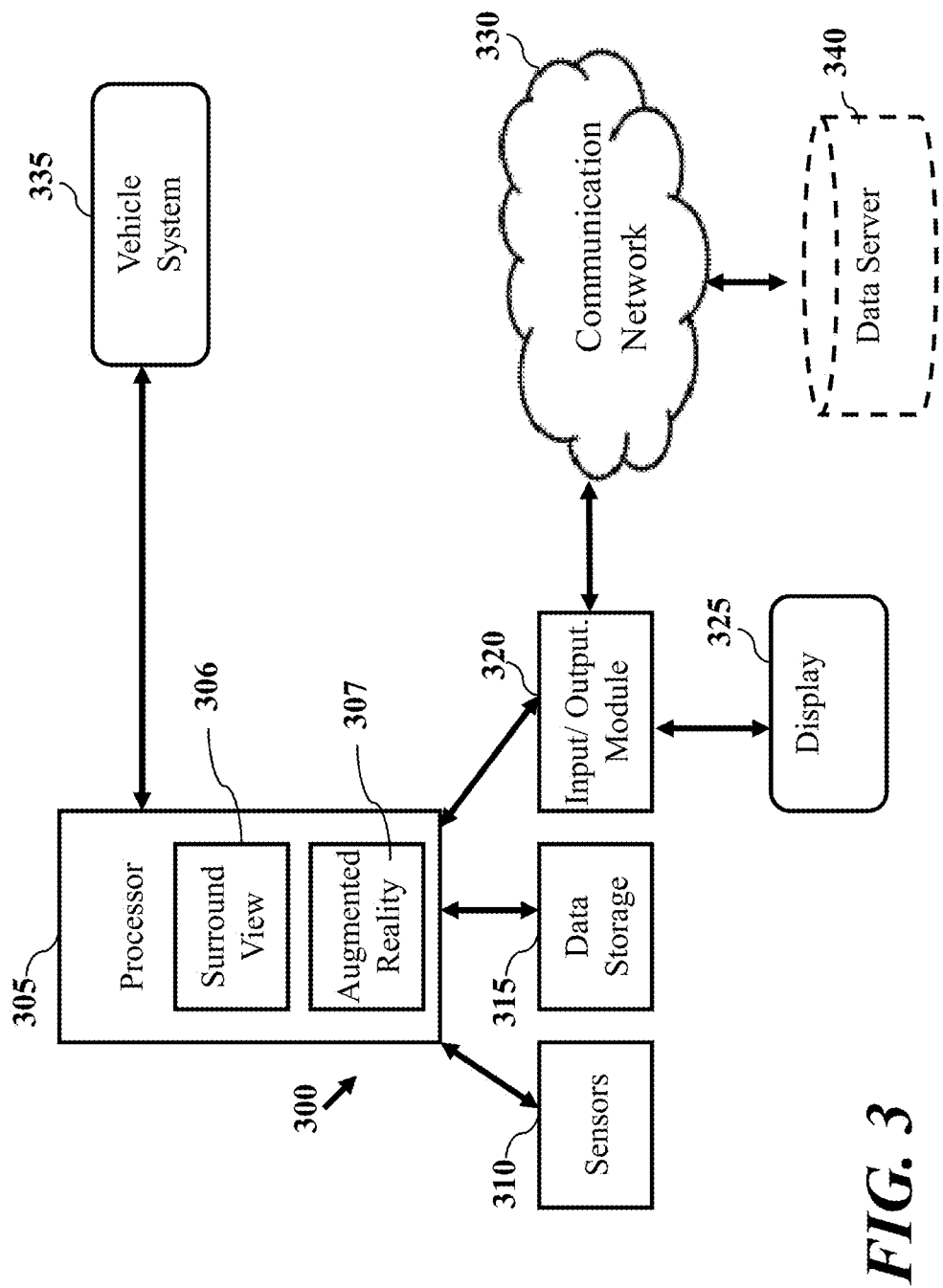
FIG. 3 depicts a graphical representation of device components according to one or more embodiments.

FIG. 3 depicts a graphical representation of device components according to one or more embodiments. According to one embodiment, device 300 relates to a vehicle device configured to provide augmented surround view image data. Vehicle devices may include audio/video units, infotainment units, display units, media processers, etc. According to one embodiment, device 300 includes processor 305, sensors 310, data storage unit 315, input/output module 320, and display 325.

Processor 305 is configured to control operation of device 300. According to one embodiment, processor 305 may be configured to run a surround view module 306 and augmented reality module 307. In other embodiments, surround view module 306 and augmented reality module 307 may be physical hardware units of device 300.

In one embodiment, surround view module 306 is configured to generate a stitched image view based on surround view image data for a vehicle. The surround view data is generated based on sensors 310, which may include multiple image sensors. Surround view module 306 outputs the stitched image view and virtual camera position data to augmented reality module 307. In one embodiment, augmented reality module 307 determines a pose estimation for a vehicle to provide vehicle position and orientation relative to the stitched image view. The augmented reality module 307 augments the stitched image view to include one or more graphical elements based on the pose estimation for the vehicle and virtual camera position. Processor 305 may also function as a control input module to control presentation of a graphical display of the stitched image view including the one or more graphical elements.

Processor 305 may include executable code to perform and control functions of device 300. By way of example, processor 305 may execute process 200 of FIG. 2 to output augmented image data. Processor 305 may execute and direct one or more processes and functional blocks described herein to present surround view image data and control presentation of elements. Processor 305 may be a vehicle control unit for presentation and control of an augmented virtual vehicle view with surround view imaging.

Sensors 310 may be configured detect image data. In one embodiment, sensors 310 include multiple camera inputs configured to detect image data relative to the surroundings of a vehicle. According to another embodiment, sensors 310 may include acceleration and orientation sensors for a device, such as a gyroscopic sensor and accelerometer. In other embodiments, sensors 310 may include elements to detect global positioning, vehicle speed, operability, external condition (e.g., distance to target, etc.) or other vehicle applications. Sensors 310 may be configured to provide output of the sensors to processor 305. In certain embodiments, data storage module 315 may store output of sensors 310, and/or processor 305 may direct or control operation of sensors 310.

Data storage unit 315 may be configured to store executable code to operate processor 305 and device 300. Input/output (I/O) module 320 may be configured to receive inputs from a controller or input surface (e.g., touch screen, input buttons, etc.) and to output image data to display 325. In certain embodiments, device 300 includes is configured to communicate over a communication network 330 (e.g., IP network) by way of I/O module 320. Device 300 may optionally request and/or output data to optional data server 340 by way of communication network 330.

In certain embodiments, device 300 and processor 305 may be configured to communicate with components of a vehicle, such as vehicle system 335. By way of example, vehicle system 335 may relate to a user interface system of a vehicle including one or more sensors, functions and data capabilities. In that fashion, vehicle system 335 may provide one or more of location data, and vehicle operating data to processor 305, including but not limited to GPS data, heading, acceleration, map information, points of interest, etc.

Figure 4:
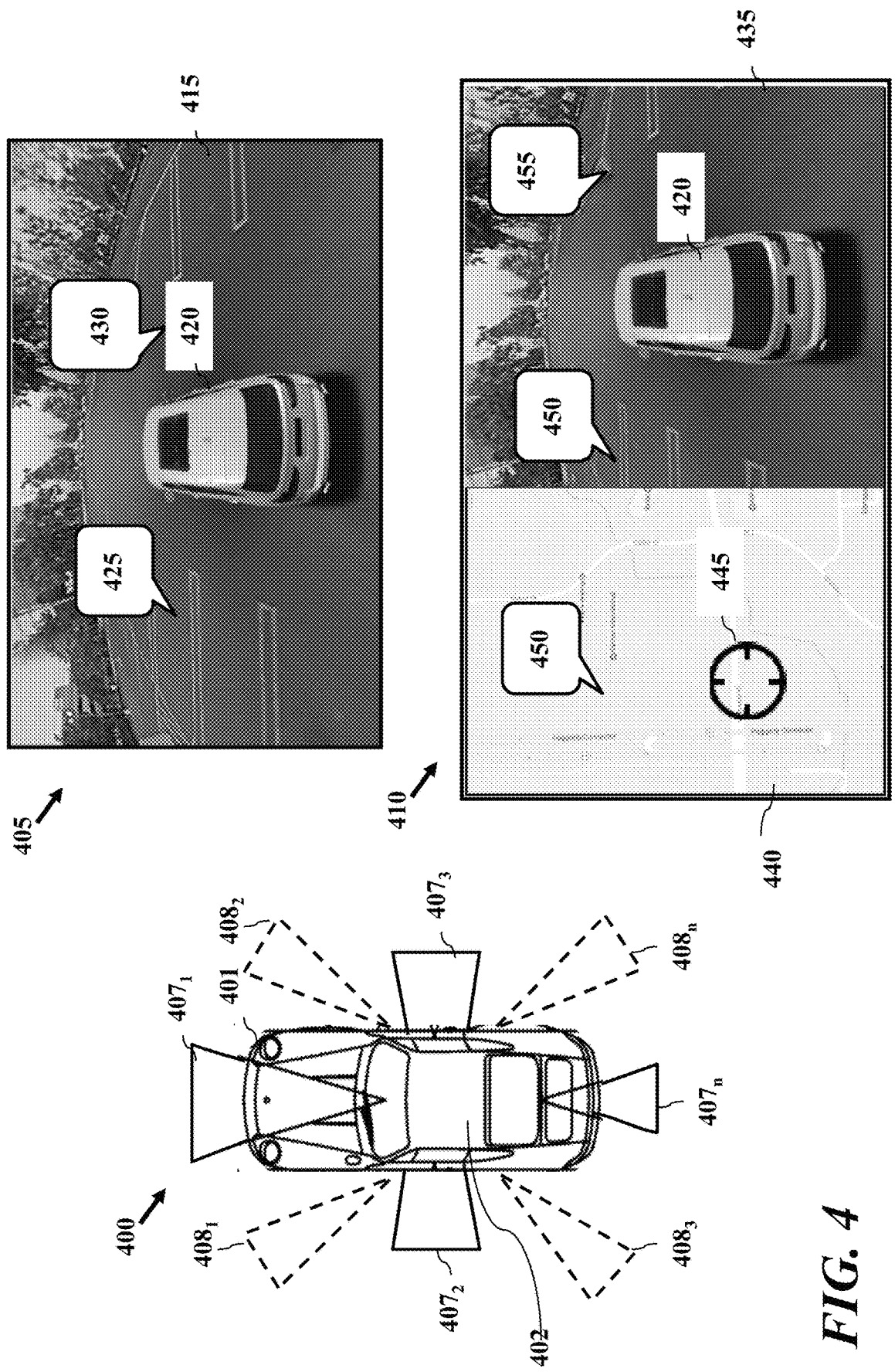
FIG. 4 depicts a graphical representation of virtual vehicle views according to one or more other embodiments.

FIG. 4 depicts a graphical representation of virtual vehicle views according to one or more other embodiments. According to one embodiment, surround view system 400 for vehicle 401 is depicted with exemplary augmented representations 405 and 410. According to one embodiment, surround view system 400 includes a plurality of cameras configured to detect surroundings $407_{1-n}$, including front surrounding $407_1$, side surroundings $407_{2-3}$ and back surrounding $407_n$. In certain embodiments, system 400 includes sensors for front diagonal surroundings $408_{1-2}$ and diagonal back surrounding $408_{3-n}$. According to one embodiment, surround view system 400 is configured to detect a surround view image for vehicle 401, includes image data to provide a complete 360 degree representation of vehicle surroundings. In addition, surround view system 400 is configured output a stitched image based on a virtual camera position of vehicle 401. In one embodiment, for example, the virtual camera position may relate to the top 402 of vehicle 401 looking out in any direction from the vantage point. Accordingly, the stitched image output by system 400 may be generated from the vantage point of position 402, even though no camera is actually placed at position 402 of vehicle 401. Surroundings $407_{1-n}$ and surroundings $408_{1-n}$ may be detected by one or more cameras each, where the cameras may include fish eye or other lens to broaden the viewing angle.

According to one embodiment, augmented representation 405 relates to a stitched image 415. According to another embodiment, an augmented reality system of system 400 augments stitched image 415 by including avatar 420 and one or more graphical elements 425 and 430 representing iconography for points of interest. Vehicle avatar 420 may be selected by a user and/or modified by the system. Points of interest 425 and 430 may relate to one or more of services, address book locations, landmarks, map items, etc. According to one embodiment, the position of points of interest 425 and 430 may be based on virtual camera position data received by an augmented reality module to position points of interest 425 and 430 in a three-dimensional space and thus overlay stitched image 415. By positioning points of interest 425 and 430 using virtual camera position data, the system can modify the position of elements an update views as a vehicle moves and as inputs to the device rotate and/or change the virtual camera position or viewing direction.

Augmented representation 410 relates to a combination of stitched image 435 presented on a display with map data 440. According to one embodiment, an augmented reality system of system 400 augments stitched image 435 by including avatar 420 and one or more graphical elements 450 and 455 representing points of interest. Map data 440 includes vehicle position represented by a graphical element 445 relate to map data and position of a point of interest 450. According to one embodiment, one or more of stitched image 435, map data 440 and points of interest 450 and 455 may be based on virtual camera position data and a pose estimation of the vehicle.

Augmented representation 405 and augmented presentation 410 each represent virtual views or a representation of the surroundings of vehicle 401. According to one embodiment, augmented representation 405 and 410 may be presented by a display (e.g., display 325) in a vehicle during operation of a vehicle. Virtual camera position may use image data detected by the vehicle sensors, however, data from each image sensor may be combined, such that a virtual view is provided from one or more imaging devices.

Figure 5A:
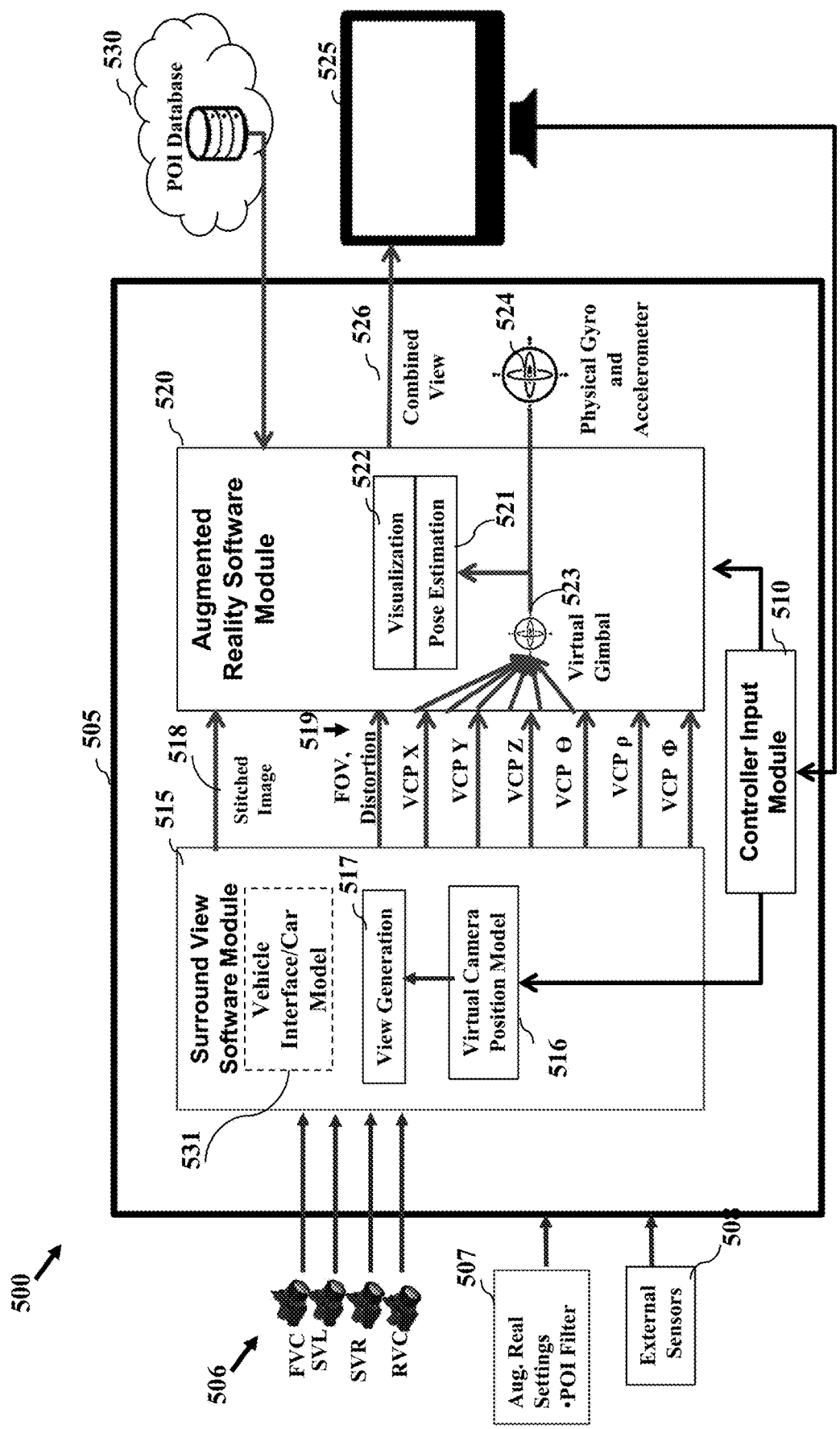
FIGS. 5A-5D depict system diagrams for augmented virtual vehicle view with surround view imaging according to one or more embodiments.

FIGS. 5A-5D depict system diagrams for augmented virtual vehicle view with surround view imaging according to one or more embodiments. According to one embodiment, systems in FIGS. 5A-5D are configured to generate augmented virtual vehicle views. Referring to FIG. 5A, system 500 includes device 505 configured to output augmented surround view imagery. Device 505 may receive data from one or more sources for a vehicle. For example, device 505 is connected to and receives image data from multiple camera inputs 506, wherein the camera inputs 506 may include separate cameras such as a front view camera (FVC), side view camera left (SVL), side view camera right (SVR), and rear view camera (RVC). In one embodiment, one or more augmented reality settings 507 may be provided to device 505 such as a point of interest filter to identify the which points of interest to display, avatars for the vehicle, graphic display elements for the points of interest, distance information, etc. Augmented reality settings 507 may include merchandising, purchasing over the air information, block chain settings, etc. In addition, one or more external sensors 508 may provide data to device 505 such as a positioning sensor (GPS sensor), etc.

According to one embodiment, device 505 includes a controller input module 510, surround view software module 515 and augmented reality software module 520. Controller input module 510 may control each of surround view software module 515 and augmented reality software module 520, detect input commands, and set the virtual camera position. In one embodiment, input commands may be entered to display 525, such as touch commands, which are provided to controller input module 510.

Surround view module 515 includes virtual camera position module 516 and view generation module 517. According to one embodiment, virtual camera position module 516 receives a desired virtual camera position from controller input module 510 and any changes to the virtual camera position. Based on the virtual camera position and image data received from multiple camera inputs 506, view generation module 517 generates a stitched image 518 output to augmented reality software module 520. Surround view module 515 also outputs virtual camera position data 519 including six degrees of freedom information for the viewing angle, and direction of the virtual camera position. Virtual camera position data 519 is output to augmented reality software module 520.

Augmented software module 520 is configured to present one or more graphical elements, such as points of interest, avatars, gaming elements etc., on stitched image 518 received from surround view software module 515. According to one embodiment, augmented software module 520 performs a pose estimation of a vehicle and virtual camera position data 519 to determine a three dimensional space of graphical elements. According to another embodiment, augmented reality software module 520 receives input from controller input module 510 indicating user input commands to position graphical elements augmented to the stitched image.

Augmented reality software module 520 includes a virtual gimbal 523 which utilizes virtual camera position data 519 to determine a horizontal plane as a point of reference. Augmented reality software module 520 also receives vehicle acceleration, direction and angle information from gyro and acceleration sensor 524. Pose estimation 521 of augmented reality software module 520 utilizes the horizontal plane and vehicle acceleration data to estimate the current position of a vehicle and operating characteristics relative to stitched image 518. According to one embodiment, visualization module 522 determines placement of graphical elements as overlays and outputs combined view 526 to display 525. According to one embodiment, points of interest available may be provided by a point of interest (POI) database 530. POI database 530 may be part of a vehicle system.

Display 525 relates to a display unit of the vehicle. In certain embodiments display 525 may be the main display unit of a vehicle infotainment system. According to another embodiment, display 525 may relate to a passenger display unit of the vehicle.

According to one embodiment, augmented software module 520 and/or elements of system 500 may be configured to output sound associated with input commands or position of a vehicles relative to iconography presented. With respect to navigation and points of interest, detected viewing angle changes for the virtual camera position may be associated with one or more sounds such as audio feedback. Audio feedback may be directional, such that a viewing angle associated with a particular direction (e.g., vehicle left side) may result in audible output. In other embodiments, such as a gaming application manipulation of the vehicle avatar, selection of iconography, avoidance (or engagement) with targets can result in output of one or more sound effects. Output of sound effects may be directional, such that the sound effects may differ based on the stitched image view presented. In that fashion, virtual camera position data may be employed to active audio of a first sound with a particular viewing angle and output of a second or other sound associated with a second viewing angle and/or vehicle position.

Figure 5B:
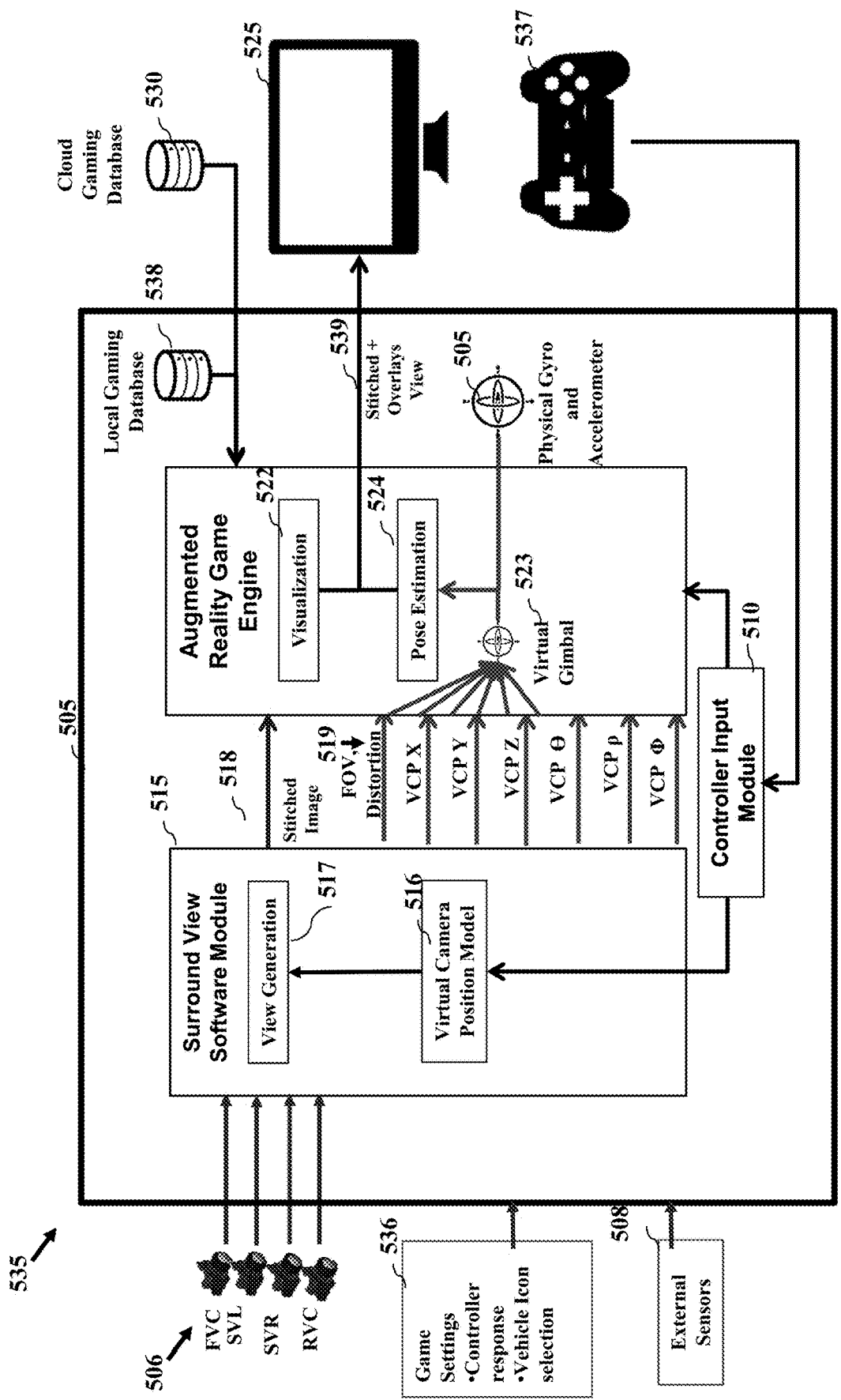

Referring to FIG. 5B, system 535 includes device 505 configured to output augmented surround view imagery including one or more gaming elements. System 535 may operate and include similar elements to system 500 described above. In FIG. 5B, device 505 is configured to receive data including game settings 536 provided to device 505 including controller response information, a vehicle avatar/icon selection, etc. Game settings 536 may include full control of virtual camera position for use with racing games, and vertically scrolling games. Game settings 536 may also include a virtual vehicle database interface for switching between avatar and image elements.

According to another embodiment, controller input module 510 is configured to received gaming controls from controller 537. Controller 537 may relate to a game controller providing directional commands, one or hard buttons, etc. In certain embodiments, controller 537 is a six axis controller. Controller input module 510 is configured to receive inputs from controller 537 directed to moving objects displayed on stitched image data 518. In one embodiment, the vehicle avatar augmented to stitched image data 518 may be manipulated in the display view to allow for a gaming application. By way of further example, one or more gaming elements augmented with stitched image data 518 and output as augmented image data with iconography at 539 to display 525 may move or be positioned on the display 525 based on local gaming data 538 and network gaming data 530. In contrast to simply presenting gaming elements on a display, augmented reality engine may position gaming elements on stitched image data 518 relative to a surround view of the vehicle and virtual camera position data.

Figure 5C:
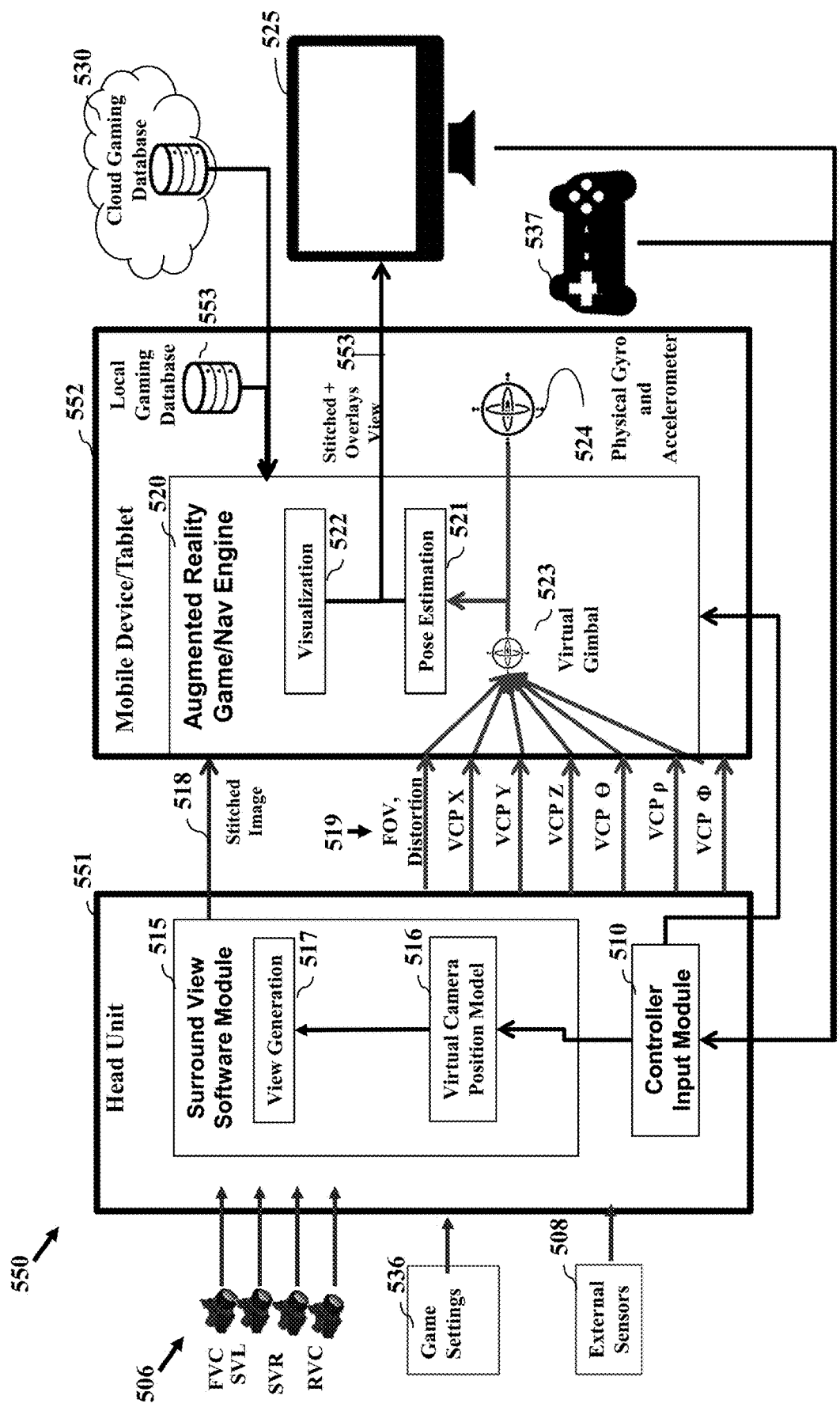

Referring to FIG. 5C, system 550 includes surround view module 515 and augmented reality software module 520 on two different devices. According to one embodiment, system 550 includes head unit 551 configured to operated with device 552 which may be a mobile device or tablet. Similar to system 535, system 550 may provide gaming functionality. It should also be appreciated that the two device arrangement of FIG. 5C may be applied similarly to the embodiments discussed above in FIG. 5A.

According to one embodiment, head unit 551 relates to a vehicle component, such as a vehicle head unit, infotainment system etc. Head unit 551 may include controller input module 510 and surround view software module 515. Head unit 551 may also receive game settings 536. Based on image data received from multiple camera inputs 506, view generation module 517 generates a stitched image 518 output to augmented reality software module 520 of device 552. According to another embodiment, controller input module 510 receives input command from one or more of display 525 and game controller 537. In certain embodiments, head unit 551 and device 552 are connected by a network connection, which may be wired or wireless. Connection formats between head unit 551 and device 552 can include audio video connections such as one or more of an HDMI, DP, USB and Ethernet.

Figure 5D:
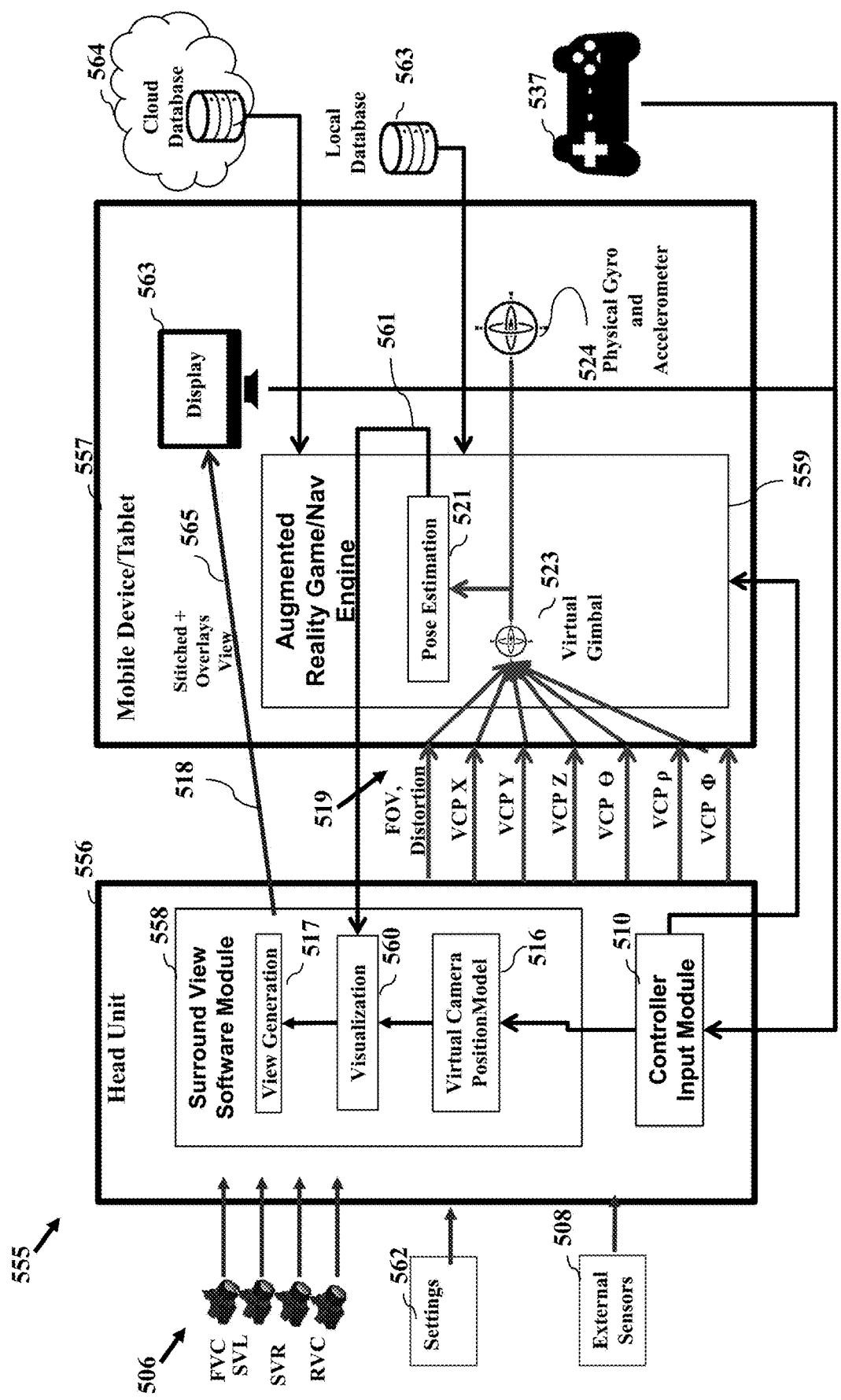

Referring to FIG. 5D, a system configuration is presented according to another embodiment. System 555 is configured to provide an augmented surround view according to one or more embodiments. System 555 includes similar elements as system 500 of FIG. 5A and system 550 of FIG. 5C. By way of example, system 555 includes head unit 556 and mobile device/tablet 557 similar to the two device configuration of system 550 of FIG. 5C. According to one embodiment, a surround view module, such as surround view module 558, is configured to include a visualization module, such as visualization module 560, to determine placement of graphical elements as overlays and for augmenting surround view image data.

Similar to systems discussed above (e.g., system 500, system 535, system 550, etc.) system 555 may provide an augmented surround view which may be applied to one or more of vehicle displays, point of interest functionality and gaming functionality. It should also be appreciated that elements of system 555 operate and/or provide functionality similar to similarly numbered elements above.

According to one embodiment, head unit 556 relates to a vehicle component, such as a vehicle head unit, infotainment system, vehicle unit in general, etc. Head unit 556 may include controller input module 510 and surround view software module 558. Surround view module 558 includes virtual camera position model module 516, view generation module 517, and visualization module 560. According to one embodiment, virtual camera position module 516 receives a desired virtual camera position from controller input module 510 and any changes to the virtual camera position.

Controller input module 510 is configured to receive one or more control signals from a controller, such as controller 537, or input commands relative to an interactive display 563 of mobile device 557. In one embodiment, display 563 may be a touch screen display and commands provided to controller input module may be based on an application or user interface for an augmented surround view. Controller input module 510 is configured to provide a desired view and changes to a particular display configuration to augmented reality engine 559. Based on image data received from multiple camera inputs 506, virtual camera position model module 516 provides virtual camera position data 519 to augmented reality software module 559.

According to one embodiment, pose estimation module 521 of augmented reality module 559 performs a pose estimation of a vehicle and virtual camera position data 519 to determine a three dimensional space of graphical elements for positioning one or more graphical elements in a three-dimensional space, including but not limited to points of interest, gaming elements, navigation elements, etc. According to another embodiment, augmented reality software module 520 receives input from controller input module 510 indicating user input commands to position graphical elements. Pose estimation module 521 of augmented reality module 559 outputs spatial display information 561, such as three dimensional display information for one more elements, to visualization module 560. In one embodiment, visualization module 560 inputs graphical elements of the augmented reality module 559 into a surround view image using an estimated pose. View generation module 517 may select a portion of the augmented surround view for presentation on display 563. In one embodiment, settings 562 allow for user settings of characters, display elements, display attributes and formatting of elements augmented to the surround view. In a gaming application, settings 562 may include an avatar to be included with the presentation. Settings 562 may provide controller response and vehicle icon selections. Similarly, points of interest, gaming display elements and navigation elements may be received from one or more of a local database 563 and cloud based database 564.

View generation module 517 outputes a stitched image 565 output to display 563 of device 557. According to another embodiment, controller input module 510 receives input commands from one or more of display 525, which may be a touch screen display, and game controller 537. Display 525 may be an integrated touch screen, such that touch commands (e.g., swipe, slide, tap, etc.) can be used to change virtual camera position and/or vehicle avatar control.

Figure 6:
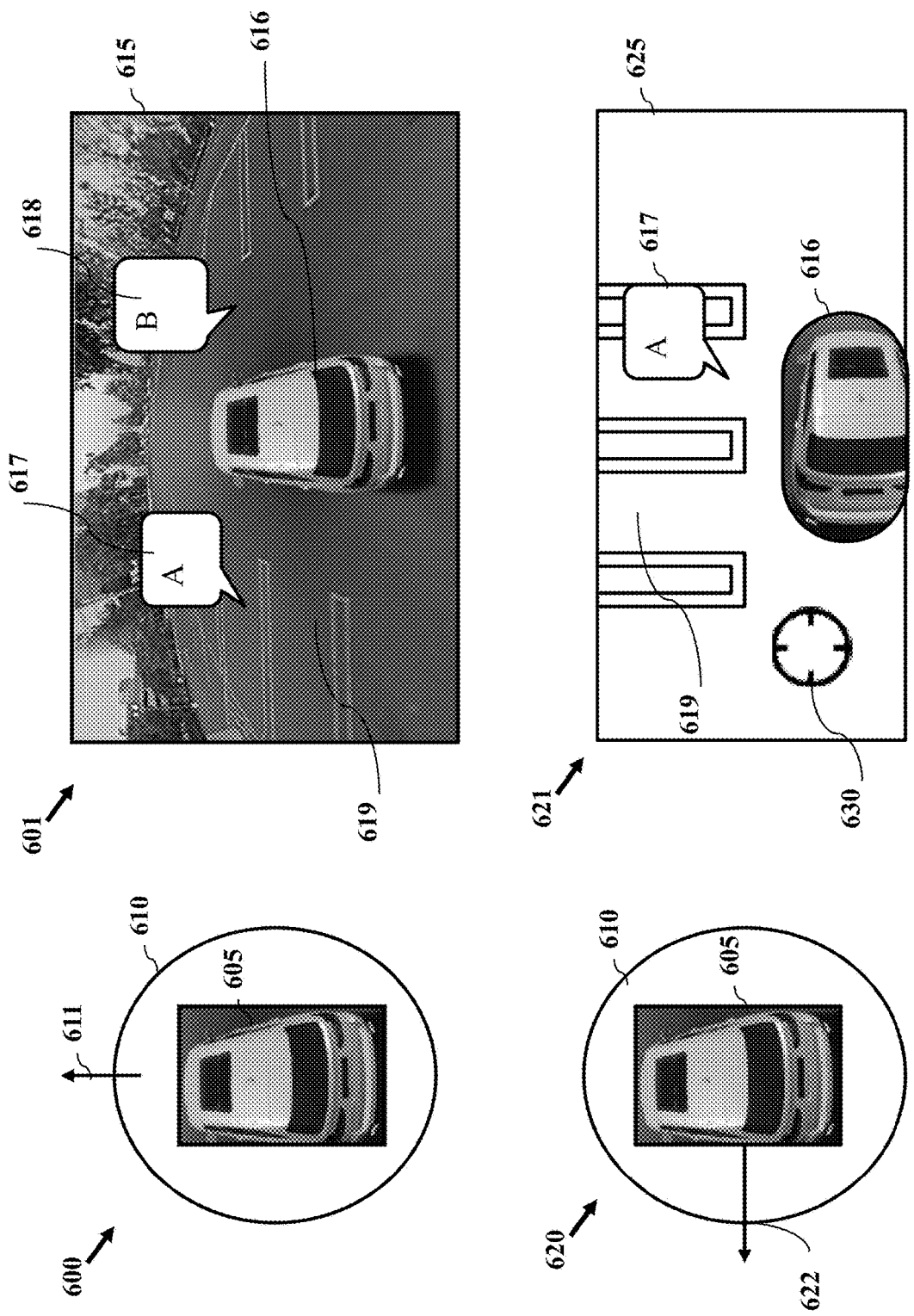
FIG. 6 depicts a graphical representation of virtual camera position according to one or more embodiments.

FIG. 6 depicts a graphical representation of virtual camera position according to one or more embodiments. According to one embodiment, virtual camera position may relate to an initial virtual camera position, such as a starting virtual camera position when an augmented virtual vehicle view is initiated or based on inputs to the controller input module that modify or change the virtual camera position. FIG. 6 illustrates an exemplary representation of virtual camera position. Virtual camera position 600 is depicted relative to a vehicle 605 with surround view image 610, wherein direction 611 indicates the virtual camera position view and direction associated with a stitched image of virtual camera position 600. According to one embodiment, virtual camera position 600 relates to a perspective above the roof view of vehicle 605. According to one embodiment, a graphical representation 601 of virtual camera position includes stitched image 615 representing a portion of surround view image 610 associated with direction 611. According to one embodiment, an augmented reality module augments stitched image 615 to include vehicle avatar 616 and graphical elements for points of interest 617 and 618. According to another embodiment, virtual camera position data provided to the augmented reality module by a surround view software module and pose estimation for vehicle 605 are used to determine the position of points of interest 617 and 618. Graphical representation 601 also includes one or more elements, shown as 619 (e.g., parking spaces) included in stitched image 615.

According to one embodiment, input commands to rotate and/or translate one or more of vehicle avatar 616 and virtual camera position 600 are detected by the augmented virtual vehicle view with surround view imaging and as result include updating of both stitched image data and display characteristics of augmented elements.

FIG. 6 illustrates an exemplary representation of an updated virtual camera position 620 depicted relative to a vehicle 605 with surround view image 610, wherein direction 621 indicates the virtual camera position view and direction associated with a stitched image of updated virtual camera position 620. According to one embodiment, updated virtual camera position 620 also relates to an above the roof view of vehicle 605, and is a left side view of vehicle 605. According to one embodiment, a graphical representation 621 of the updated virtual camera position includes stitched image 625 representing a portion of surround view image 610 associated with direction 622 (e.g., the left side surround view). According to one embodiment, an augmented reality module augments stitched image 625 to include vehicle avatar 616 and graphical elements for point of interest 617. According to another embodiment, virtual camera position data provided to the augmented reality module by a surround view software module and pose estimation for vehicle 605 are used to determine the position of point of interest 617. Graphical representation 621 also includes one or more elements, shown as 619 (e.g., parking spaces) included in stitched image 615. Accordingly, a change in the virtual camera position detected by a controller input module allows for manipulation such as rotation or translation of the stitched image view and still allows for points of interest to be displayed, however, points of interest that are not associated with the window of an updated virtual camera position, such as point of interest 618 may not be included, while the position of a point of interest, such as point of interest 617 are retained and repositioned. According to another embodiment, augmented stitched image 625 may also include a graphical element, such as element 630, display to allow for manipulation or control of the virtual camera position or view.

Figure 7:
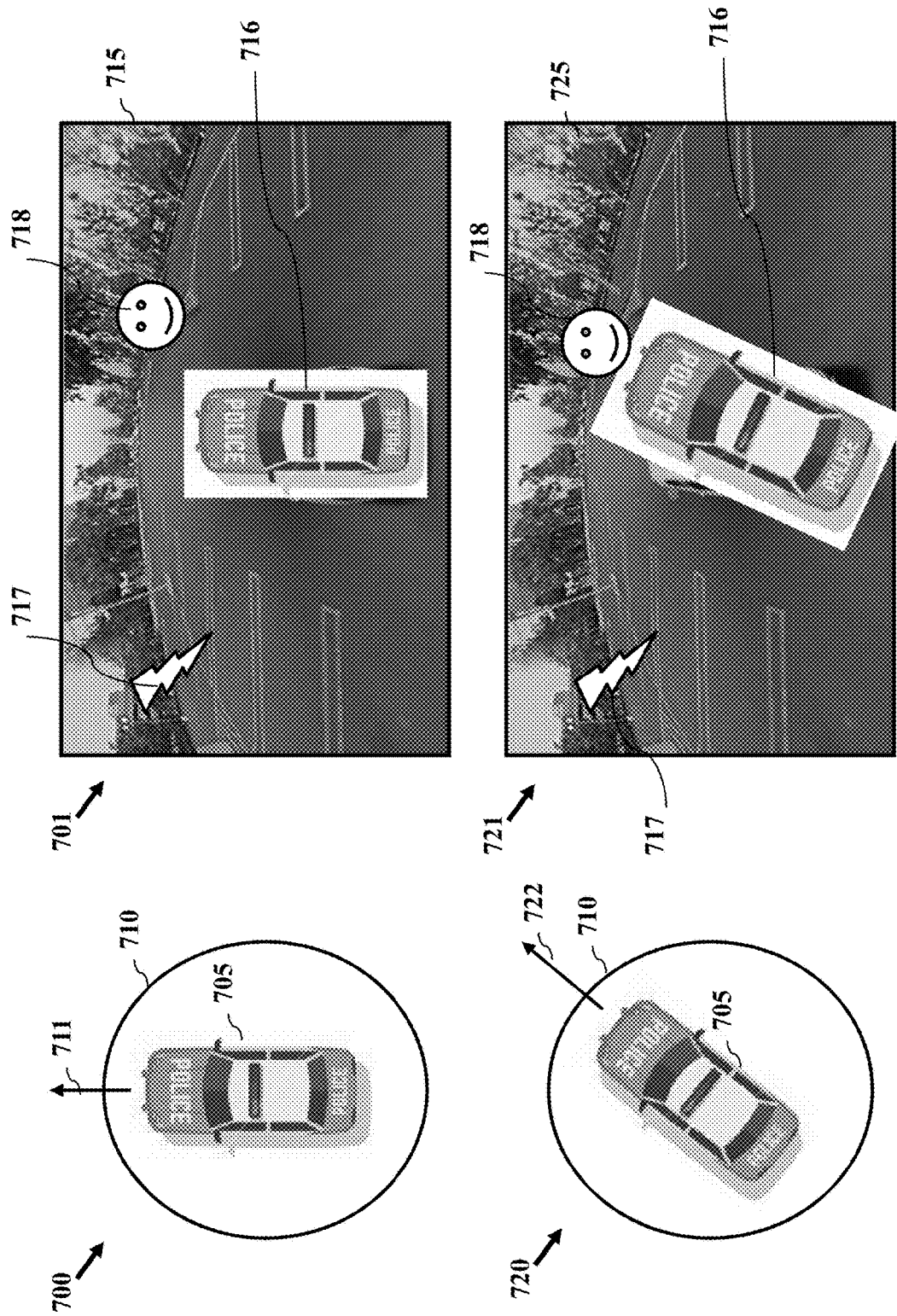
FIG. 7 depicts a graphical representation of virtual camera position according to one or more other embodiments.

FIG. 7 depicts a graphical representation of virtual camera position according to one or more other embodiments. According to one embodiment, virtual camera and augmented elements may be associated with a gaming application. FIG. 7 depicts an augmented image with manipulation of elements. FIG. 7 illustrates virtual camera position 700 depicted relative to a vehicle 705 with surround view image 710, wherein direction 711 indicates the virtual camera position view and direction associated with a stitched image of virtual camera position 700. According to one embodiment, virtual camera position 700 relates to an above the roof view of vehicle 705. According to another embodiment, a graphical representation 701 of virtual camera position includes stitched image 715 representing a portion of surround view image 710 associated with direction 711. According to one embodiment, an augmented reality module augments stitched image 715 to include vehicle avatar 716 and iconography for gaming elements 715 and 718. According to another embodiment, virtual camera position data provided to the augmented reality module by a surround view software module and pose estimation for vehicle 705 are used to determine the position of gaming elements 717 and 718.

According to one embodiment, input commands to rotate and/or translate one or more of vehicle avatar 716 and virtual camera position 700 are detected by the augmented virtual vehicle view with surround view imaging and as result can include updating of both stitched image data and display characteristics of augmented elements.

FIG. 7 illustrates an exemplary representation of an updated virtual camera position 720 depicted relative to a vehicle 705 with surround view image 710, wherein direction 722 indicates the virtual camera position view and direction associated with a stitched image of updated virtual camera position 720. According to one embodiment, updated virtual camera position 720 also relates to an above the roof view of vehicle 705. According to one embodiment, a graphical representation 721 of the updated virtual camera position includes stitched image 725 representing a portion of surround view image 710 associated with direction 722. According to one embodiment, an augmented reality module augments stitched image 725 to include vehicle avatar 716 as being translated toward gaming element 718. Accordingly, a change in the virtual camera position detected by a controller input module allows for manipulation such as rotation or translation of the stitched image view and allows for virtual gaming with surround view image data.

Figure 8:
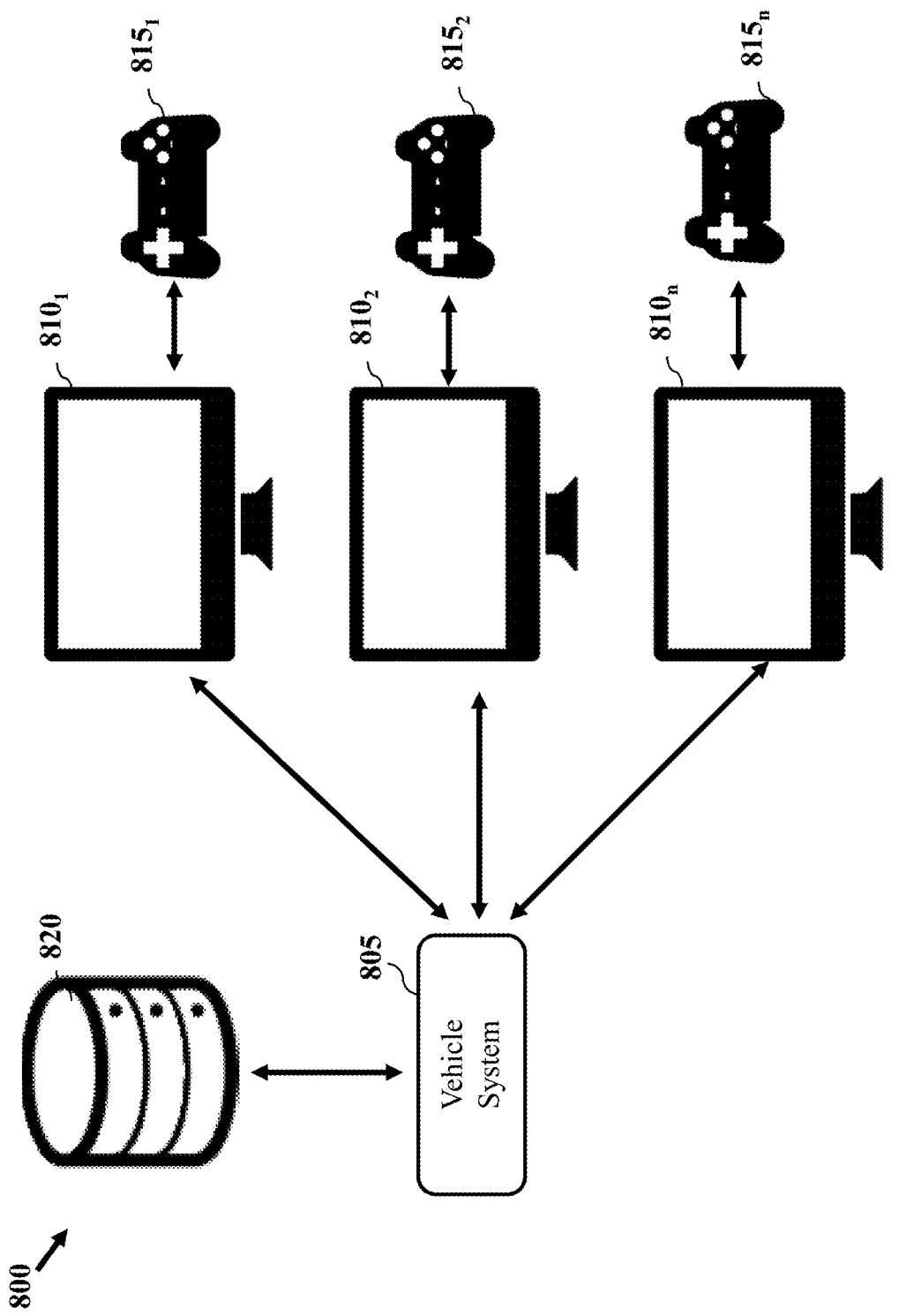
FIG. 8 depicts a system diagram according to one or more embodiments.

FIG. 8 depicts a system diagram according to one or more embodiments. According to one embodiment, the augmented surround view systems discussed herein can be provided for vehicle passengers. FIG. 8 depicts system 800 servicing multiple display panels and controllers. In one embodiment, system 800 allows for multiple passengers, such as bus, van, etc.

According to one embodiment, a vehicle system 805 includes one or more modules to output augmented surround view image data. In one embodiment, vehicle system 805 interfaces with a plurality of displays 810$_{1-n}$ wherein each display 810$_{1-n}$ may be independently controlled by a controller, such as controllers 815$_{1-n}$. According to one embodiment, each display 810$_{1-n}$ may allow for manipulation or adjustment of a virtual camera position relative to the camera, such that display 810$_1$ may display one direction (e.g., direction 611), while display 810$_2$ may display a stitched image according to another direction (e.g., direction 622). According to another embodiment, each display may provide a different set of iconography or filters based on user selections.

While this disclosure has been particularly shown and described with references to exemplary embodiments thereof, it will be understood by those skilled in the art that various changes in form and details may be made therein without departing from the scope of the claimed embodiments.

What is claimed is:

1. A method for presentation and control of an augmented virtual vehicle view with surround view imaging, the method comprising:
   generating, by a first device, a stitched image view based on surround view image data for a vehicle, wherein the surround view image data is generated based on multiple image sensors of the vehicle;
   outputting, by the first device, the stitched image view and virtual camera position data to an augmented reality module of the first device;
   determining, by the first device, a pose estimation for the vehicle, wherein the pose estimation provides vehicle position and orientation relative to the stitched image view;
   augmenting, by the first device, the stitched image view to include one or more graphical elements based on the pose estimation for the vehicle and virtual camera position, wherein augmenting the stitched image includes visualization of points of interest in the surround view image data to provide presentation of graphical elements to match physical locations of elements outside of the vehicle;
   presenting, by the first device, a graphical display of the stitched image view including the one or more graphical elements and a vehicle avatar, wherein the stitched view is presented from a perspective of the virtual camera position, the virtual camera position providing a view point from the vehicle and wherein the virtual camera position data is generated and utilized to determine where in three dimensional space the one or more graphical elements appear; and
   detecting position commands for avatar position within the graphical display and updating position of the avatar and iconography in response to the position commands.

2. The method of claim 1, wherein the surround view image data includes image data for a complete 360 degree circumferential image with respect to position of the vehicle and the stitched image relates to a portion of the circumferential image from the perspective of the virtual camera position.

3. The method of claim 1, wherein a surround view module of the first device outputs the stitched image view and virtual camera position data to an augmented reality module of the first device, the virtual camera position data including six degree of freedom camera data.

4. The method of claim 1, wherein an augmented reality module of the first device determines a pose estimation for the vehicle based on data generated by a vehicle sensor for acceleration and tilt of the vehicle.

5. The method of claim 1, wherein augmenting the stitched image view by the first device includes presentation of a vehicle avatar and iconography for points of interest based on the pose estimation for the vehicle and virtual camera position.

6. The method of claim 1, wherein presenting the graphical display of the stitched image view including the one or more graphical elements includes arranging iconography for one or more points of interest in a display window based on the pose estimation, wherein the pose estimation and virtual camera position allow for placement of the iconography into stitched image based on the direction of the vehicle.

7. The method of claim 1, wherein virtual camera position data provides six degrees of freedom data characterizing the stitched image view output by a surround view module.

8. The method of claim 1, wherein detecting position commands for the avatar position includes a command to translate a vehicle avatar toward iconography.

9. The method of claim 1, further comprising detecting changes to a virtual camera position and updating the output image to modify position of graphical elements in a displayed view.

10. The method of claim 1, wherein position commands for the avatar position include input commands to rotate and translate a vehicle avatar with surround view imaging to update stitched image data and display characteristics of augmented elements.

11. A vehicle control unit for presentation and control of an augmented virtual vehicle view with surround view imaging, the vehicle control unit comprising:
   a surround view module configured to
      generate a stitched image view based on surround view image data for a vehicle, wherein the surround image view data is generated based on multiple image sensors of the vehicle, and output the stitched image view and virtual camera position data to an augmented reality module of the first device;
an augmented reality module configured to
  determine a pose estimation for the vehicle, wherein the pose estimation provides vehicle position and orientation relative to the stitched image view, and
  augment the stitched image view to include one or more graphical elements based on the pose estimation for the vehicle and virtual camera position, wherein augmenting the stitched image includes visualization of points of interest in the surround view image data to provide presentation of graphical elements to match physical locations of elements outside of the vehicle;
a control input module configured to control presentation of a graphical display of the stitched image view including the one or more graphical elements and a vehicle avatar, wherein the stitched view is presented from a perspective of the virtual camera position, the virtual camera position providing a view point from the vehicle and wherein the virtual camera position data is generated and utilized to determine where in three dimensional space the one or more graphical elements appear; and
detecting position commands for avatar position within the graphical display and updating position of the avatar and iconography in response to the position commands.

12. The control unit of claim 11, wherein the surround view image data includes image data for a complete 360 degree circumferential image with respect to position of the vehicle and the stitched image relates to a portion of the circumferential image from the perspective of the virtual camera position.

13. The control unit of claim 11, wherein a surround view module of the first device outputs the stitched image view and virtual camera position data to an augmented reality module of the first device, the virtual camera position data including six degree of freedom camera data.

14. The control unit of claim 11, wherein an augmented reality module of the first device determines a pose estimation for the vehicle based on data generated by a vehicle sensor for acceleration and tilt of the vehicle.

15. The control unit of claim 11, wherein augmenting the stitched image view by the first device includes presentation of a vehicle avatar and iconography for points of interest based on the pose estimation for the vehicle and virtual camera position.

16. The control unit of claim 11, wherein presenting the graphical display of the stitched image view including the one or more graphical elements includes arranging iconography for one or more points of interest in a display window based on the pose estimation, wherein the pose estimation and virtual camera position allow for placement of the iconography into stitched image based on the direction of the vehicle.

17. The control unit of claim 11, wherein virtual camera position data provides six degrees of freedom data characterizing the stitched image view output by a surround view module.

18. The control unit of claim 11, wherein detecting position commands for the avatar position includes a command to translate a vehicle avatar toward iconography.

19. The control unit of claim 11, further comprising detecting changes to a virtual camera position and updating the output image to modify position of graphical elements in a displayed view.

20. The control unit of claim 11, wherein position commands for the avatar position include input commands to rotate and translate a vehicle avatar with surround view imaging to update stitched image data and display characteristics of augmented elements.

* * * * *